United States Patent
Jeong

(10) Patent No.: US 9,098,131 B2
(45) Date of Patent: Aug. 4, 2015

(54) INPUT SYSTEM WITH STYLUS PEN HAVING TWO COILS AND ELASTIC MEMBER

(71) Applicant: LG DISPLAY CO., LTD., Seoul (KR)

(72) Inventor: Il-Doo Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 13/934,018

(22) Filed: Jul. 2, 2013

(65) Prior Publication Data

US 2014/0132529 A1    May 15, 2014

(30) Foreign Application Priority Data

Nov. 13, 2012    (KR) .......................... 10-2012-0127906

(51) Int. Cl.
*G06F 3/033*        (2013.01)
*G06F 3/0354*       (2013.01)
*G06F 3/044*        (2006.01)
*G06F 3/046*        (2006.01)

(52) U.S. Cl.
CPC ............ *G06F 3/03545* (2013.01); *G06F 3/044* (2013.01); *G06F 3/046* (2013.01); *G06F 2203/04106* (2013.01)

(58) Field of Classification Search
CPC ....................................................... G06F 3/042
USPC ................... 345/173, 174, 179, 180; 178/18.01–18.06
See application file for complete search history.

(56) References Cited

U.S. PATENT DOCUMENTS

| | | | |
|---|---|---|---|
| 8,427,454 B2 * | 4/2013 | Yeh et al. ........................ | 345/179 |
| 8,659,580 B2 * | 2/2014 | Mao et al. ...................... | 345/179 |
| 8,878,824 B2 * | 11/2014 | Besperstov .................... | 345/179 |
| 2004/0125089 A1 * | 7/2004 | Chao et al. ..................... | 345/179 |
| 2008/0150918 A1 * | 6/2008 | Hagen et al. ................... | 345/179 |
| 2011/0219892 A1 | 9/2011 | Fukushima et al. | |

FOREIGN PATENT DOCUMENTS

| | | |
|---|---|---|
| JP | 2011-065450 A | 3/2011 |
| KR | 10-2011-0057385 A | 6/2011 |
| KR | 10-2011-0102122 A | 9/2011 |

* cited by examiner

*Primary Examiner* — Pegeman Karimi
(74) *Attorney, Agent, or Firm* — Birch, Stewart, Kolasch & Birch, LLP

(57) ABSTRACT

Discussed is an input system that includes a sensor panel including plural first and second channels intersecting each other, a stylus pen including a first core and a second core divided from each other, a primary coil and a secondary coil wound on the first and second cores, an elastic member interposed between the first core and the second core, a resonant capacitor and a switch connected to the secondary coil in series, and a conductive tip connected to the primary coil, a ground unit connected to the stylus pen, an antenna loop formed at the edge area of the sensor panel, and a touch controller connected to the first and second channels and the antenna loop.

19 Claims, 15 Drawing Sheets

Active area   Antenna loop

INPUT SYSTEM WITH STYLUS PEN HAVING TWO COILS AND ELASTIC MEMBER

This application claims the benefit of Korean Patent Application No. 10-2012-0127906, filed on Nov. 13, 2012, which is hereby incorporated by reference as if fully set forth herein.

BACKGROUND OF THE INVENTION

1. Field of the Invention

The present invention relates to an input system, and more particularly, to an input system which may implement a stylus pen without a battery, detect both touch by fingers and touch by the stylus pen, and increase sensitivity to writing pressure.

2. Discussion of the Related Art

As the information age has arrived, the field of displays visually expressing electrical information signals has rapidly developed, and in order to satisfy such a trend, various flat display devices having excellent performance, such as thin thickness, light weight and low power consumption, have been researched and rapidly replaced conventional cathode ray tubes (CRTs).

Flat display devices include liquid crystal displays (LCDs), plasma display panels (PDPs), field emission displays (FEDs), electro luminescence displays (ELDs), etc. These display devices essentially include a flat display panel displaying a picture in common, and the flat display panel is configured such that a pair of transparent insulating substrates is bonded under the condition that a light emitting material layer or an optically anisotropic material layer is interposed between the substrates.

In such a display device, requirements to add a touch panel recognizing a touched region through a human hand or a separate input unit and transmitting corresponding separate information are increased. Recently, such a touch panel is attached to the external surface of the display device.

Touch panels are divided into a resistive type, a capacitive type, an infrared sensing type, etc., according to touch sensing methods, and the capacitive type is in the spotlight in consideration of ease in the manufacturing method and sensing force.

Recently, a human interface device (HID), such as a smart phone or a smart book, as a mobile device increasingly uses a stylus pen which implements writing and drawing as well as touch input through fingers, as an input unit. Input through the stylus pen executes more precise input as compared to input through fingers, and supports functions, such as precise picture drawing and character writing.

Hereinafter, with reference to the accompanying drawings, a general capacitive-type touchscreen will be described.

FIG. 1 is a circuit diagram illustrating a general capacitive-type touch detection circuit, and FIG. 2 is a graph illustrating voltage output according to time divided by whether or not fingers touch the circuit using the circuit diagram of FIG. 1.

As exemplarily shown in FIG. 1, the general capacitive-type touch detection circuit includes first electrodes Tx and second electrodes Rx which intersect each other, an amplifier 5 provided with a negative (−) input terminal receiving output of the second electrode Rx and a positive (+) input terminal receiving reference voltage Vref, and a capacitor Cs formed between an output terminal and the negative (−) input terminal of the amplifier 5.

Here, input voltage Vin is applied through a pad provided at one end of the first electrode Tx, and output voltage Vout output through the amplifier 5 is sensed through a pad provided at one end of the second electrode Rx.

In general, a touch drive signal of square waves of about 2~3 μs is applied to the first electrode Tx as the input voltage Vin. Here, a voltage value in proportion to mutual capacitance Cm between the first and second electrodes Tx and Rx is sensed as the output voltage Vout.

As exemplarily shown in FIG. 2, when the square waves are applied as the input voltage Vin, the output voltage Vout increases (if the circuit is not touched by fingers) as time goes by, and, if the circuit is touched by fingers, the fingers contact the electrodes, the mutual capacitance Cm decreases and thus the increment of the output voltage Vout decreases. Then, such decrement is detected at the respective intersections of Tx channels and Rx channels, and coordinates of a region of the circuit touched by the fingers are extracted from these data.

However, when the touch detection circuit is touched by a stylus pen rather than fingers, a contact area of the tip of the stylus pen with the surface of a sensor panel is relatively small, mutual capacitance variation ΔCm between the electrodes is small, and thus sensing of the mutual capacitance variation ΔCm when the touch detection circuit is touched by the stylus pen may be difficult. Thereby, accuracy in extraction of coordinates may be lowered.

Further, if the tip of the stylus pen is smaller than the electrodes provided on the sensor panel for sensing, distortion of coordinates may occur according to presence or absence of the electrodes, and this may directly influence sensitivity.

Further, in case of finger touch and stylus pen touch, when the same touch detection circuit is used, touch by a palm contacting the electrodes and touch by the stylus pen during input by the stylus pen may not be discriminated from one another. That is, it may be difficult for the detection circuit of FIG. 1 to perform a palm rejection function when the detection circuit is touched by the stylus pen.

Further, a method of detecting stylus pen touch in a driving type differing from the driving type of finger touch, for example, an electromagnetic driving type, is proposed. However, in this case, a panel which may execute detection through electromagnetic driving needs to be separately provided in addition to capacitive-type electrodes, and thus the number of components is increased and the number of processes is increased.

The above-described general capacitive-type touchscreen has problems, as follows.

First, since a contact area of the tip of the stylus pen with the sensor panel surface is relatively small, mutual capacitance variation ΔCm between the electrodes is small, and thus sensing of the mutual capacitance variation ΔCm when the touch detection circuit is touched by the stylus pen may be difficult. Thereby, accuracy in extraction of coordinates may be lowered.

Second, if the tip of the stylus pen is smaller than the electrodes provided on the sensor panel for sensing, distortion of coordinates may occur according to presence or absence of the electrodes, and this may directly influence sensitivity.

Third, in case of finger touch and stylus pen touch, when the same touch detection circuit is used, touch by a palm contacting the electrodes and touch by the stylus pen during input by the stylus pen may not be discriminated from one another. That is, it may be difficult for the capacitive-type touchscreen to perform a palm rejection function when the touchscreen is touched by the stylus pen.

Fourth, a method of detecting stylus pen touch in a driving type differing from the driving type of finger touch, for example, an electromagnetic driving type, is proposed. However, in this case, a panel which may execute detection through electromagnetic driving, in addition to capacitive-type electrodes, needs to be separately provided and thus the number of components is increased and the number of processes is increased.

SUMMARY OF THE INVENTION

Accordingly, the present invention is directed to an input system that substantially obviates one or more problems due to limitations and disadvantages of the related art.

An object of the present invention is to provide an input system which may implement a stylus pen without a battery, detect both touch by fingers and touch by the stylus pen, and increase sensitivity to writing pressure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an input system includes a sensor panel including a plurality of first channels and a plurality of second channels which intersect each other, a stylus pen including a first core and a second core divided from each other, a primary coil and a secondary coil wound on the first and second cores, an elastic member interposed between the first core and the second core, a resonant capacitor and a switch connected to the secondary coil in series, and a conductive tip connected to the primary coil, a ground unit connected to the stylus pen, an antenna loop formed at the outer area of the sensor panel, and a touch controller connected to the first channels, the second channels, and the antenna loop.

When the stylus pen presses the surface of the sensor panel, the thickness of the elastic member may be reduced and thus an interval between the primary coil and the secondary coil may be reduced as pressure generated by pressing the stylus pen onto the surface of the sensor panel is increases.

The first core and the second core may be formed of ferrite.

The surface of at least one of the first core and the second core corresponding to the elastic member may be provided with a depression and a prominence, and thus, the elastic member may be inserted into the depression. Further, the elastic member may be provided with an opening corresponding to the protrusion.

The cross-section of the elastic member may have a circular or polygonal shape.

The stylus pen may further include a conductive body including the first core and the second core on which the primary coil and the secondary coil are wound, connected in series by the elastic member interposed therebetween, and provided with a hole partially protruding the conductive tip under the second core.

The first core may be fixed to the inside of the conductive body at the opposite side of the conductive tip.

When the stylus pen presses the surface of the sensor panel, the conductive body may become close to the surface of the sensor panel according to the pressing of the stylus pen onto the surface of the sensor panel.

The conductive body may be connected to the ground unit.

The switch may be formed of an elastic material, be electrically insulated from the conductive tip, and be operated by pressure applied to the conductive tip.

The switch may be connected to the secondary coil, and be electrically insulated from the second core.

One end of the primary coil may be connected to the conductive tip, and the other end of the primary coil may be connected to the conductive body.

The antenna loop may receive an inductance signal resonated from the secondary coil within the stylus pen when the stylus pen touches the surface of the sensor panel.

For this purpose, the antenna loop may surround the outer area of the sensor panel, and both ends of the antenna loop may be provided with pads and be connected to the touch controller through the pads.

The ground unit may be a user or a wire connected between the conductive body and the sensor panel.

The touch controller may include an amplifier connected to the antenna loop and amplifying a difference between voltages received at both ends of the antenna loop, an analog front end (AFE) connected to the amplifier and removing noise, an analog to digital converter (ADC) connected to the AFE and converting an analog signal into a digital signal, a digital signal processor (DSP) connected to the ADC and extracting coordinates by collecting digital signals, and a drive signal generator generating a signal applied to the respective channels in the sensor panel.

When the stylus pen touches the surface of the sensor panel, the switch may be closed and the secondary coil and the resonant capacitor may form a closed circuit.

The signal applied from the drive signal generator to the respective channels may be square waves or sine waves of the same frequency as resonance frequency in the closed circuit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an input system and a touch detection method using the same in accordance with one embodiment of the present invention will be described with reference to the accompanying drawings.

The input system in accordance with the embodiment of the present invention basically has a structure of detecting finger touch in a capacitive type, and may detect stylus pen touch by resonance through an inner resonant circuit of a stylus pen and an antenna loop at the edge area of a sensor panel. That is, the input system may detect stylus pen touch, which is limited in detection in the capacitive type, without influence on a contact area or the shape of an electrode pattern by changing the configuration of the edge area of the sensor panel and the inner circuit of the stylus pen without using a separate panel.

Hereinafter, the configuration of capacitive-type electrodes within an active area and stylus pen touch using the same will be described.

Figure 1:
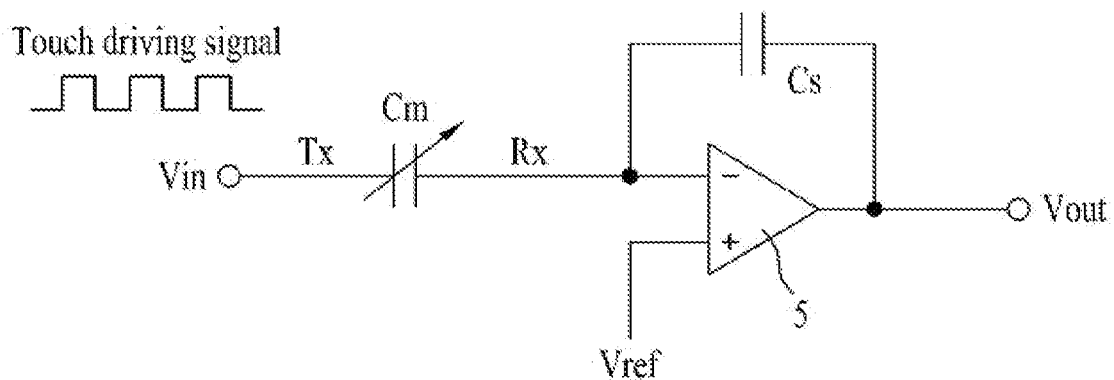
FIG. 1 is a circuit diagram illustrating a general capacitive-type touch detection circuit.
Figure 2:
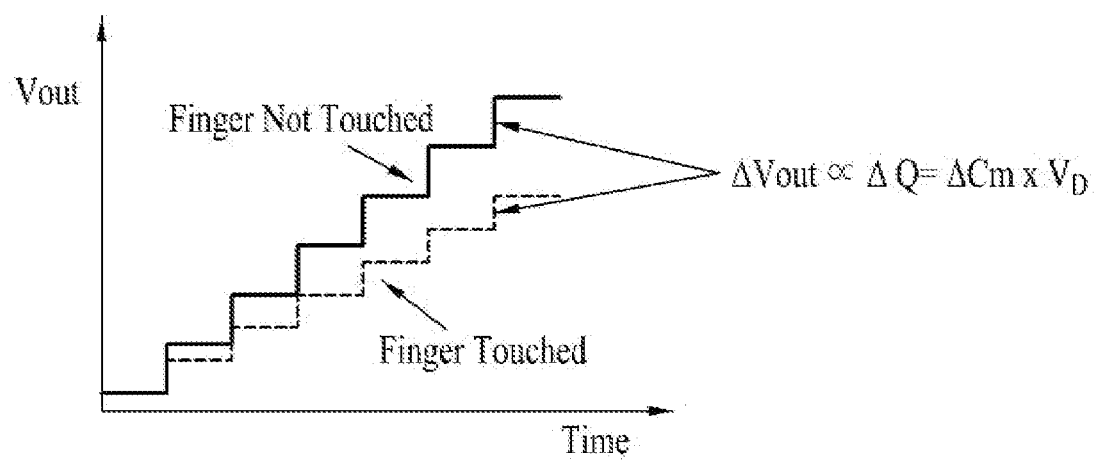
FIG. 2 is a graph illustrating voltage output according to time divided by whether or not fingers touch the circuit using the circuit diagram of FIG. 1.
Figure 3:
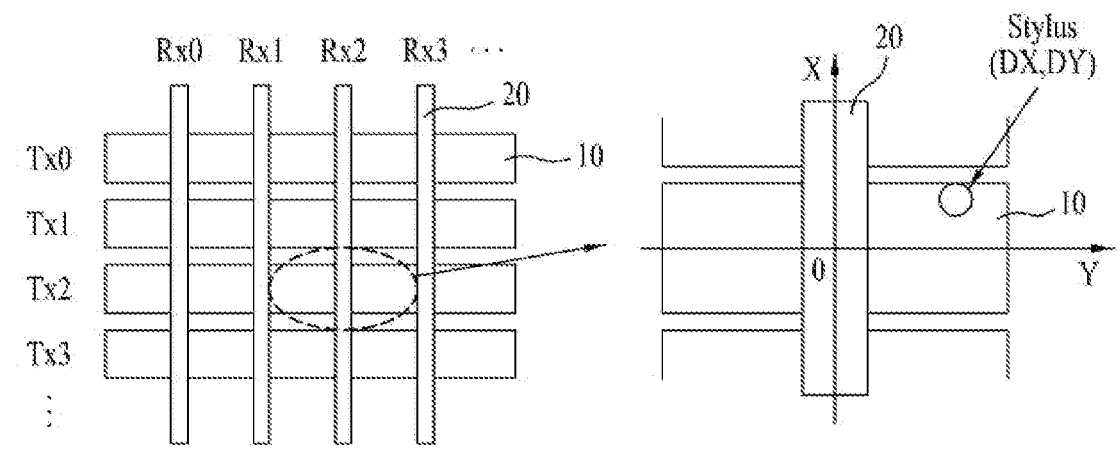
FIG. 3 is a plan view illustrating the internal structure of an active area of an input system in accordance with one embodiment of the present invention.
Figure 4:
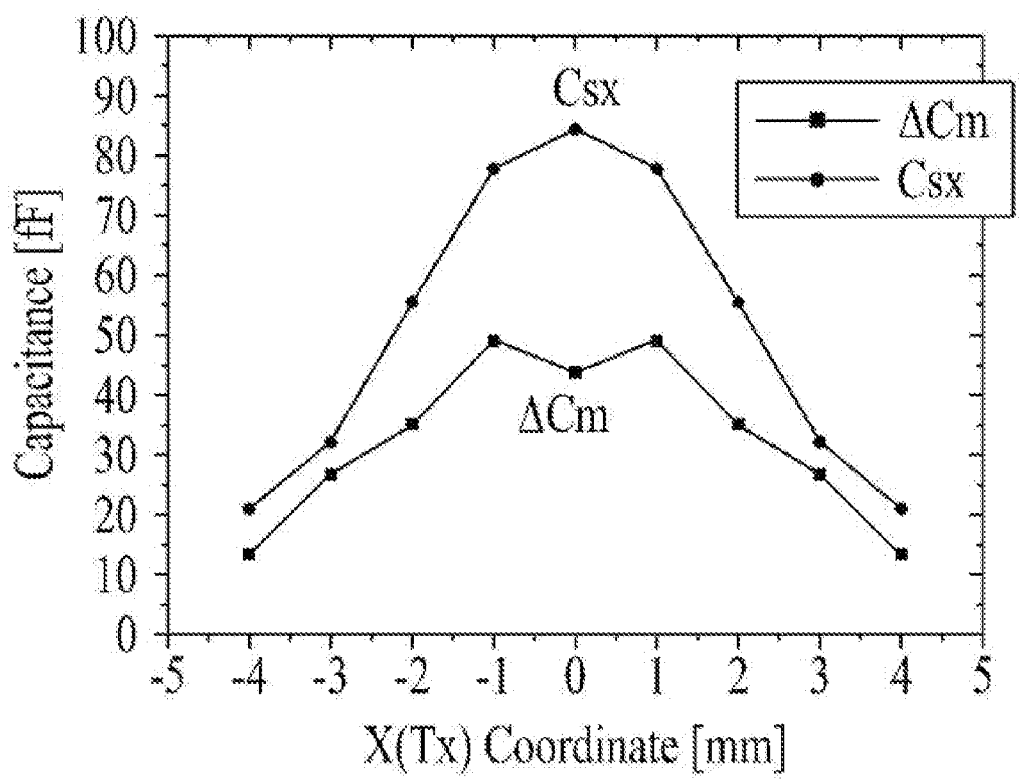
FIG. 4 is a graph illustrating capacitance Csx between a stylus pen and channels Tx and variation of capacitance Cm between the channels Tx and channels Rx according to presence or absence of the stylus pen, in the input system of FIG. 3.

FIG. 3 is a plan view illustrating the internal structure of the active area of the input system in accordance with one embodiment of the present invention, and FIG. 4 is a graph illustrating capacitance Csx between the stylus pen and channels Tx and variation of capacitance Cm between the channels Tx and channels Rx according to presence or absence of the stylus pen, in the input system of FIG. 3.

If the channels Tx and the channels Rx are formed in a bar shape, as exemplarily shown in FIG. 3, the electrodes are arranged so as to intersect each other. Variation of capacitance upon movement of the stylus pen in the region of FIG. 3 will be described with reference to FIG. 4.

In the graph of FIG. 4, based on the center of the channel Tx and the channel Rx used as the original point, one axis is defined as the X-axis and the axis orthogonal to the X-axis is defined as the Y-axis, and variation of capacitance is detected according to the position of the stylus pen. In the drawings, the vertical axis is illustrated as the X-axis (the direction of the channel Rx), and the horizontal axis is illustrated as the Y-axis. A test is carried out only by changing the X-axis value while setting the Y-axis value to 0.

Here, $\Delta Cm$ represents a difference of mutual capacitance between the channel Tx and the channel Rx according to presence or absence of the stylus pen, and $Csx$ represents distribution of capacitance between the stylus pen and the channel Tx. It is understood that the value of $Csx$ is greater than the value of $\Delta Cm$ in all regions, and variation of $Csx$ is greater than variation of $\Delta Cm$ as the value of the X-axis approaches 0. Further, it is understood that the value of $\Delta Cm$ at the region of 0 is smaller than that at other regions. Therefore, in order to detect touch by the stylus pen, use of $Csx$ rather than $\Delta Cm$ is advantageous in terms of sensitivity and position resolution.

Therefore, in the input system in accordance with the embodiment of the present invention, the position of the stylus pen is measured, but a detection method for $Csx$ having higher sensitivity is used.

Figure 5:
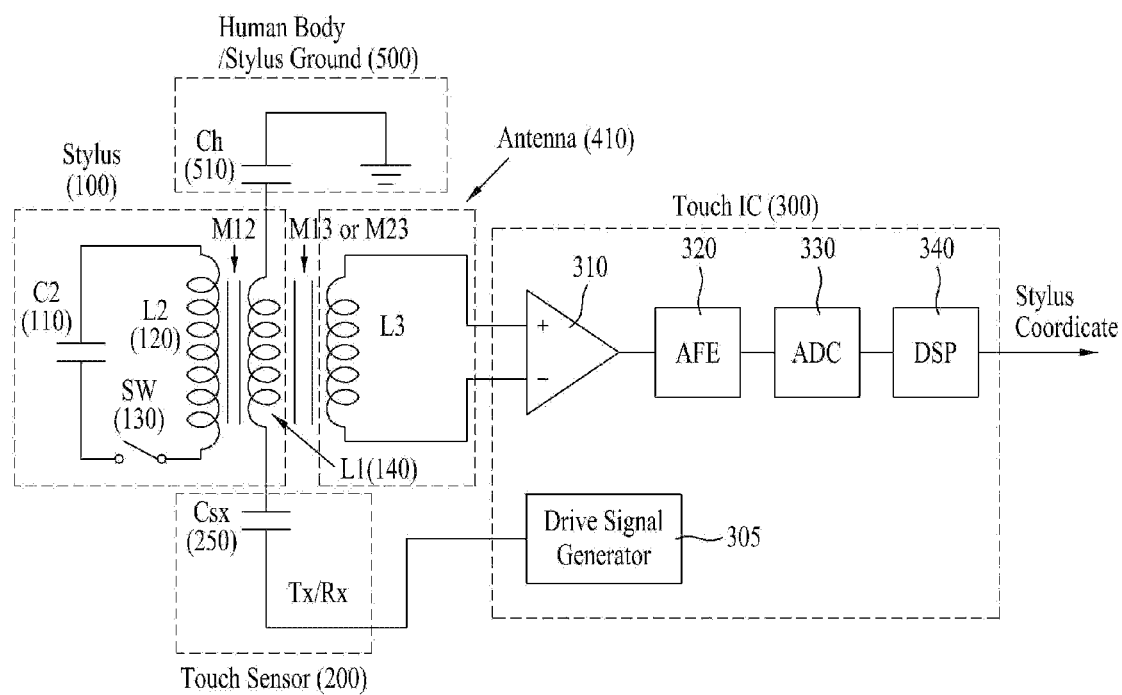
FIG. 5 is a circuit diagram illustrating the input system in accordance with the embodiment of the present invention.
Figure 6:
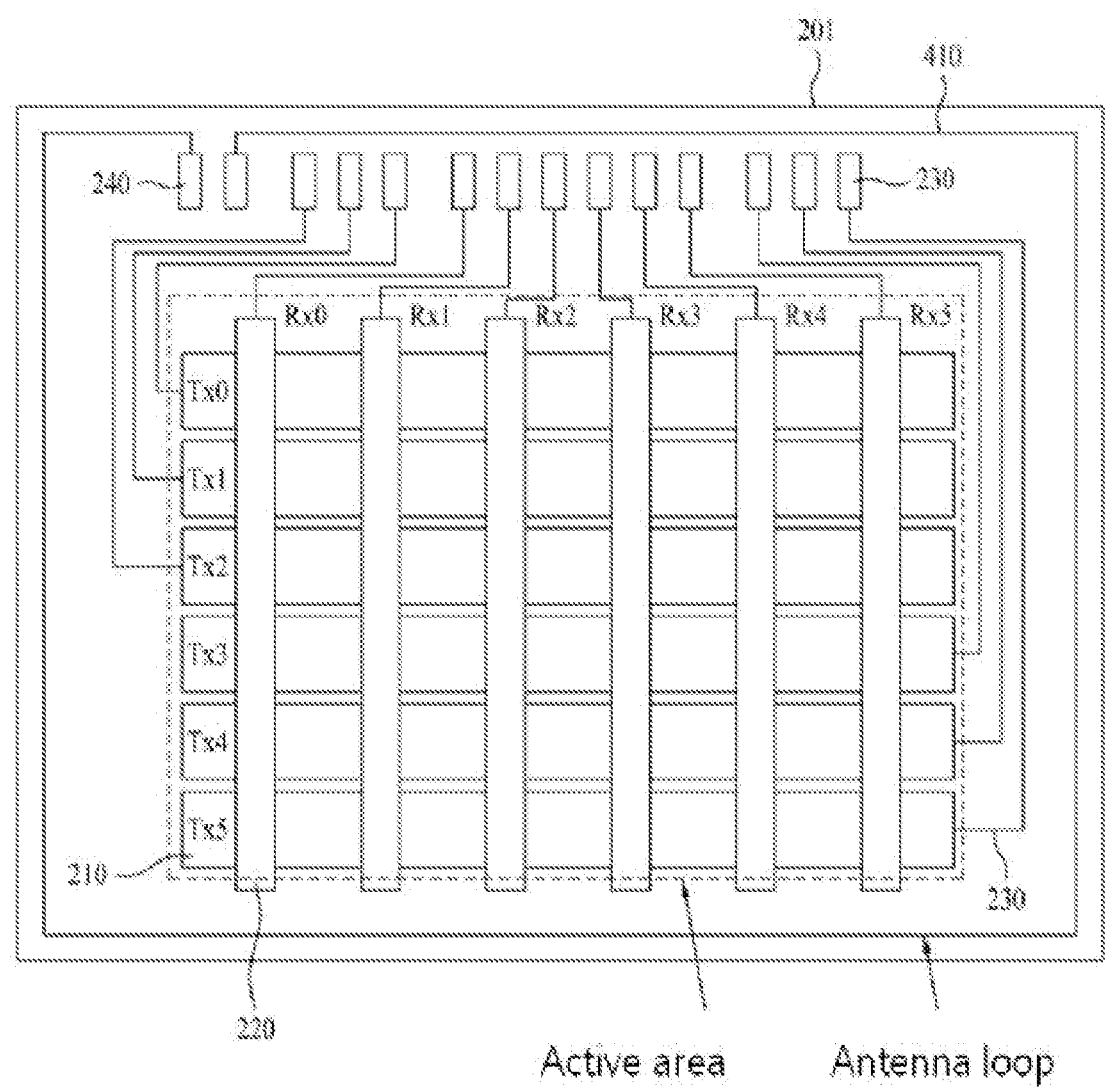
FIG. 6 is a plan view illustrating a touch sensor panel of the input system in accordance with the embodiment of the present invention.
Figure 7:
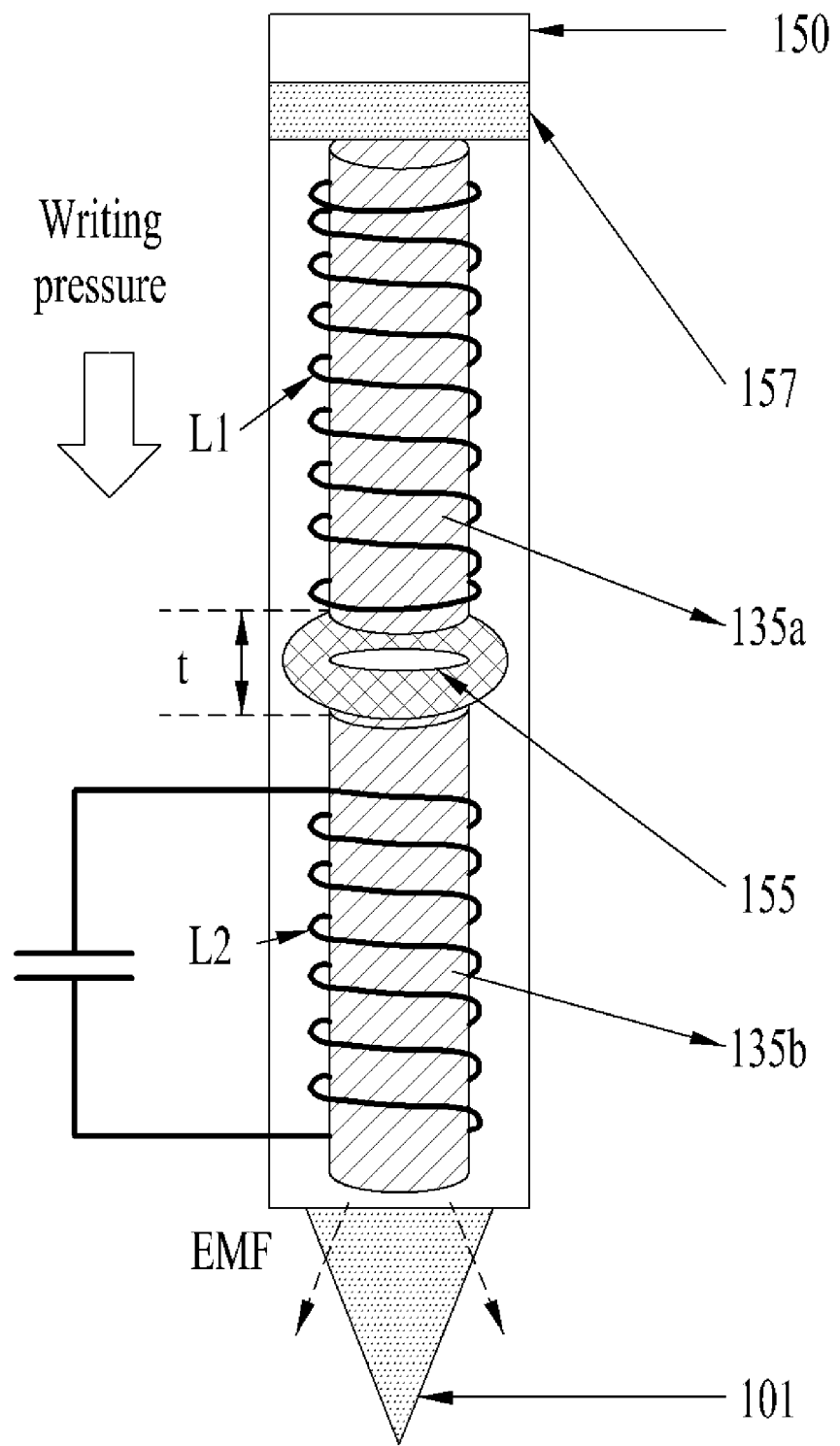
FIG. 7 is a schematic view illustrating the stylus pen of the input system in accordance with the embodiment of the present invention.

FIG. 5 is a circuit diagram illustrating the input system in accordance with the embodiment of the present invention, FIG. 6 is a plan view illustrating a touch sensor panel of the input system in accordance with the embodiment of the present invention, and FIG. 7 is a schematic view illustrating the stylus pen of the input system in accordance with the embodiment of the present invention.

As exemplarily shown in FIGS. 5 and 6, the input system in accordance with the embodiment of the present invention is generally divided into a sensor panel 201 (with reference to FIG. 6) including a stylus pen 100, a touch sensor 200, an antenna loop 410 and a touch controller 300, and a stylus ground unit 500.

The touch sensor 200 includes a plurality of first channels Tx and a plurality of second channels Rx which intersect each other, and is located in the active area corresponding to the center of the sensor panel 201. Further, the antenna loop 410 having both ends slightly separated from each other surrounds the outside of the active area of the sensor panel 201. Such an antenna loop 410 functions as a tertiary coil (L3) inducing mutual inductance with coils within the stylus pen 100.

Further, the stylus pen 100, as exemplarily shown in FIG. 7, includes a primary coil (L1) 140 and a secondary coil (L2) 120 which are divided from each other, a resonant capacitor (C2) 110 and a switch (SW) 130 connected to the secondary coil 120 in series, and a conductive tip 101 connected to the primary coil L1 140.

Here, the antenna loop 410 functions as a tertiary coil (L3) when the stylus pen 100 contacts the sensor panel 201.

The stylus pen 100 is connected to the stylus ground unit 500, and stabilizes the internal circuit of the stylus pen 100.

The antenna loop 410 formed in the edge area of the sensor panel 210 and the first channels Tx and the second channels Rx formed in the active area of the sensor panel 210 are respectively connected to the touch controller 300, and thus are controlled by signals from the touch controller 300.

As exemplarily shown in FIG. 6, the sensor panel 201 of the input system in accordance with the embodiment of the present invention is generally divided into the active area and the edge area.

The plurality of first channels Tx 210 and the plurality of second channels Rx 220 have a bar shape, and intersect each other in the active area. Although the bar-shaped first and second channels Tx 210 and Rx 220 are illustrated, the first and second channels Tx 210 and Rx 220 may be formed in other shaped-patterns in the capacitive-type, as needed. For example, the first and second channels Tx 210 and Rx 220 may be formed in a diamond pattern or other diagonal shapes. In any case, the input system in accordance with the embodiment of the present invention requires that the first and second channels Tx 210 and Rx 220 are formed in a shape which is vertically and horizontally symmetrical about the center so as to increase accuracy of stylus pen touch.

Further, in order to receive an electromagnetic signal generated from the resonant circuit within the stylus pen 100, the antenna loop 410 is formed in the edge area of the sensor panel 201. The antenna loop 410 is formed to have a larger size than the active area in which stylus pen input is substantially carried out and extraction of coordinates is carried out. This serves to solve the edge effect in which accuracy in extraction of coordinates at the edge area of the sensor panel is lowered due to asymmetry of the channels in detection of touch using the stylus pen 100.

The antenna loop 410 is a kind of tertiary coil executing induction of inductance, and does not have a separate magnetic core having a physical shape. Here, the antenna loop 410 may be a coil operated via an air coil.

The first channels Tx 210 and the second channels Rx 220 may be transparent electrodes to execute light transmission in a display device. In a finger touch section, the first channels Tx 210 are used to apply a drive signal, the second channels Rx 220 are used to receive a detection signal, and the first channels Tx 210 and the second channels Rx 220 are electrically connected to pads 230 provided at one edge of the sensor panel 210 through routing wiring lines 225.

Further, loop pads 240 disposed in parallel with the pads 230 provided at one edge of the sensor panel 201 are formed at both ends of the antenna loop 410, and a voltage difference between the two loop pads 240 may be detected by the touch controller 300.

The antenna loop 410 may be formed together with the routing wiring lines 225 through the same process. Otherwise, in order to improve electromagnetic induction of the antenna loop 410, a sheet-type planar magnetic core contacting the antenna loop 410 may be further provided in the sensor panel 100.

Further, the antenna loop 410 receives an inductance signal resonated from the secondary coil L2 of the stylus pen 100 when the surface of the sensor panel 201 is touched by the stylus pen 100, through induction of mutual inductance (M23) between the antenna loop 410 functioning as the tertiary coil (L3) and the secondary coil (L2) or mutual inductance (M13) between the antenna loop 410 functioning as the tertiary coil (L3) and the primary coil (L1).

Here, the antenna loop 410 is formed to surround the edge area of the sensor panel 201, and the loop pads 240 provided at both ends of the antenna loop 410 are connected to the touch controller 300.

Further, the touch controller 300 includes an amplifier 310 connected to the antenna loop 410 and amplifying a difference between voltages received at both ends of the antenna loop 410, an analog front end (AFE) 320 connected to the amplifier 310 and removing noise, an analog to digital converter (ADC) 330 connected to the AFE 320 and converting an analog signal into a digital signal, a digital signal processor (DSP) 340 connected to the ADC 330 and extracting coordinates by collecting digital signals, and a drive signal generator 305 generating a signal applied to the respective channels in the sensor panel 201.

When the stylus pen 100 touches the sensor panel 201, the switch (SW) 130 of the stylus pen 100 is closed, and the secondary coil (L2) 120 and the resonant capacitor (C2) 110 form a closed circuit which is a kind of resonant circuit.

As the signal applied to the respective channels by the drive signal generator 305, square waves or sine waves of the same frequency as resonance frequency ($f=1/[2\pi(L2*C2)^0.5]$) within the closed circuit may be applied. The signal applied to the respective channels is a kind of AC voltage, and has a waveform similar to a signal applied to the respective coils or a signal shape, the waveform of which increases as time goes by.

The stylus ground unit 500 may be a wire connected between a user contacting the stylus pen 100 or the stylus pen 100 and the sensor panel 201. Here, non-described mark Ch represents a ground unit capacitor generating ground unit capacitance between the stylus pen 100 and a ground terminal under the condition that the user functions as a dielectric when the user contacts the stylus pen 100.

The primary coil (L1) 140 and the secondary coil (L2) 120 within the stylus pen 100 are respectively wound on a first core 135a (with reference to FIG. 7) and a second core 135b (with reference to FIG. 7) passing through the internal central axis of the stylus pen 100, and first mutual inductance (M12) is generated between the two coils 140 and 120 by coupling. An elastic member 155 (with reference to FIG. 7) is interposed between the first and second cores 135a and 135b. The value of the first mutual inductance (M12) may be adjusted by adjusting the thickness of the elastic member 155 according to writing pressure, and thereby, such writing pressure may be sensitively sensed.

The secondary coil (L2) 120 and the resonant capacitor (C2) 110 have proper values so as to generate electromagnetic resonance with the frequency of a signal input through a sensing capacitor (Csx) 250 formed by capacitive coupling with the touch sensor 200 including the first and second channels Tx and Rx of the sensor panel 201 which intersect each other. Here, the resonance frequency has the requirements of $f=1/[2\pi(L2*C2)^0.5]$. The sensing capacitor (Csx) 250 is not an element having physical circuit configuration, and is generated by capacitive coupling at the contact region of the conductive tip of the stylus pen 100 with the sensor panel 201 when the conductive tip of the stylus pen 100 contacts the sensor panel 201.

Further, a magnetic field signal generated from the stylus pen 100 during electromagnetic resonance generates induced electromotive force onto the tertiary coil (L3) corresponding to the antenna coil by second mutual inductance (M23 or M13) between the primary coil (L1) 140 or the secondary coil (L2) 120 and the antenna loop 410 formed on the sensor panel 210. After such induced electromotive force is amplified by the amplifier 310 which may amplify the difference of voltages applied to both ends of the antenna loop 410, passes through the AFE 320 including a filter to remove noise, and is then converted into a digital signal by the ADC 330, the DSP 340 extracts coordinates from the digital signal through a proper algorithm, and then transmits coordinate data to a host system.

One end of the primary coil (L1) 140 within the stylus pen 100 is connected to the conductive tip 101, and the other end of the primary coil (L2) 120 is connected to a conductive body 150 (with reference to FIG. 7) of the stylus pen 100 formed of a conductive material and is grounded. When a user forms the ground unit 500, as needed, the other end of the primary coil (L2) 120 is connected to the ground unit capacitor (Ch) corresponding to the body of the user.

Here, non-described reference numeral 157 represents a core supporter 15 fixing the first core 135a to the inside of the body 150.

Figure 8:
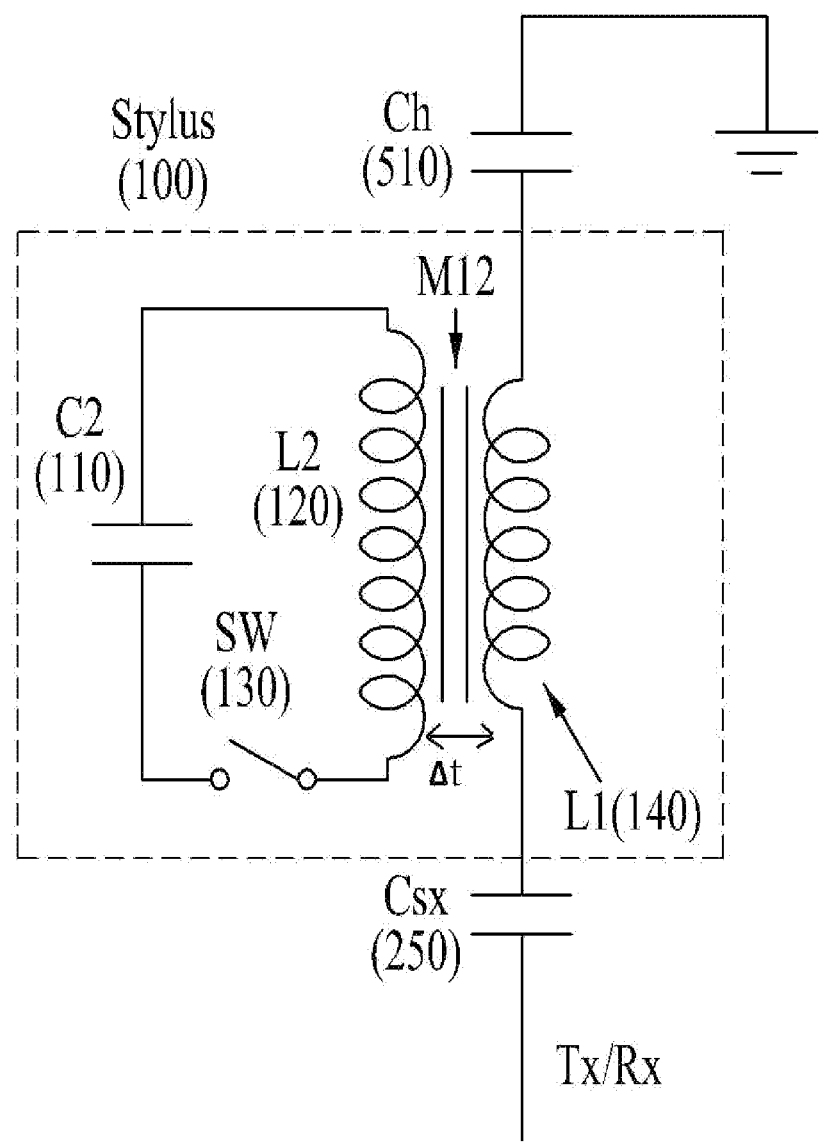
FIG. 8 is a circuit diagram illustrating a portion corresponding to the stylus pen of FIG. 7.
Figure 9:
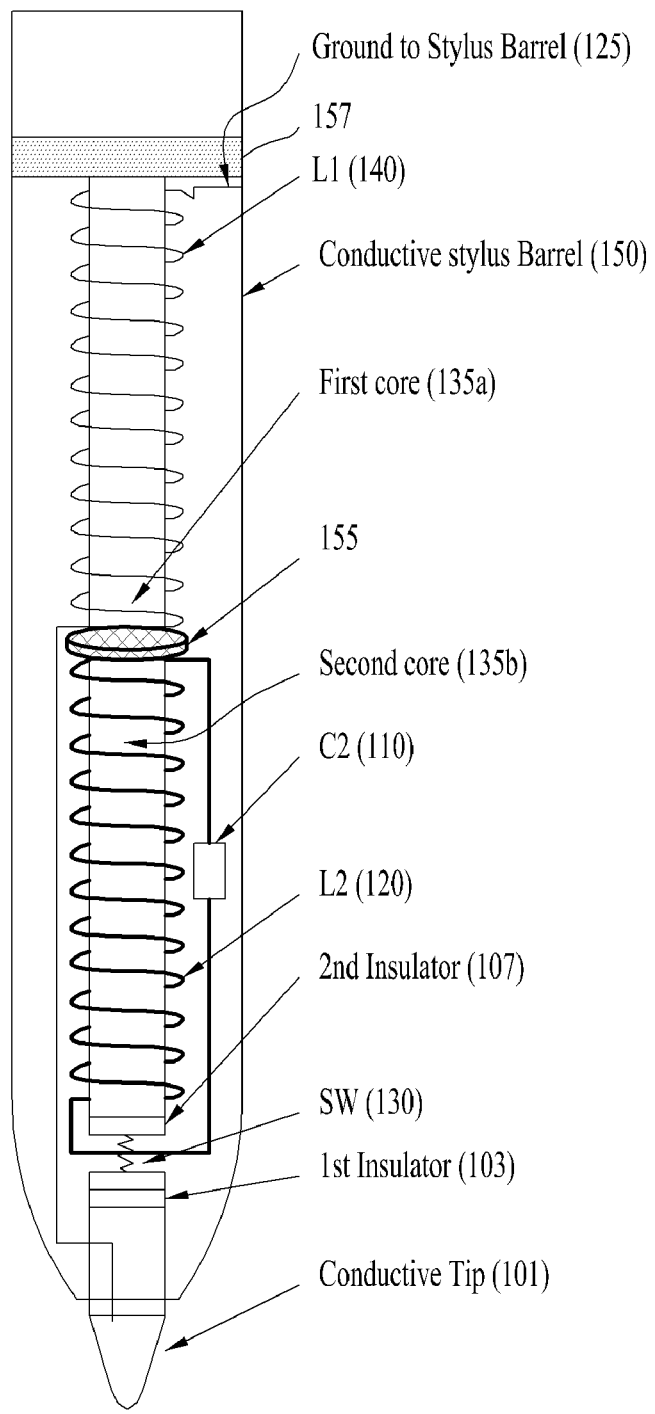
FIG. 9 is a view illustrating the detailed internal configuration of the stylus pen in accordance with the embodiment of the present invention.

FIG. 8 is a circuit diagram illustrating a portion corresponding to the stylus pen of FIG. 7, and FIG. 9 is a view illustrating the detailed internal configuration of the stylus pen in accordance with the embodiment of the present invention.

As exemplarily shown in FIG. 8, the stylus pen 100 in accordance with the embodiment of the present invention has an internal structure in which the primary coil (L1) 140 and the secondary coil (L2) 120 are respectively wound on the first core 135a and the second core 135b divided from each other and disposed in series. The elastic member 155 is disposed between the first and second cores 135a and 135b, and the thickness t of the elastic member 155 is decreased as pressure of the conductive tip 101 pressing the sensor panel surface increases.

Here, the first and second cores 135a and 135b are formed of a magnetic material, for example, ferrite.

The primary coil (L1) 140 and the secondary coil (L2) 120, the resonant capacitor (C2) 110 and the first and second cores 135a and 135b are provided within the conductive body 150 of the stylus pen 100, and a hole through which the conductive tip 101 partially protrudes to the outside may be formed on the conductive body 150.

The conductive tip 101 is electrically insulated from the conductive body 150, and for this purpose, an insulating part (not shown) surrounding the conductive tip 101 may be further provided around the hole.

Further, the conductive body 150 may be connected to the above-described stylus ground unit 500.

The switch (SW) 130 is formed of an elastic material, and in order to maintain electrical insulation between the switch (SW) 130 and the conductive tip 101, a first insulator 103 may be provided between the switch (SW) 130 and the conductive tip 101. Further, in order to maintain insulation between the switch (SW) 130 and the second core 135b located thereon if writing pressure is not applied, a second insulator 107 may be formed between the switch (SW) 130 and the second core 135b.

Opening and closing of the switch (SW) 130 in the stylus pen 100 is determined by pressure applied by the conductive tip 100 when the conductive tip 100 presses the sensor panel 201. That is, the conductive tip 100 presses the sensor panel at a designated pressure or more, the switch (SW) 130 is closed, and thus the resonant capacitor 110 and the secondary coil 120 are directly connected to form the closed internal resonant circuit.

Further, one end of the switch (SW) 130 is connected to the secondary coil (L2) 120.

One end of the primary coil (L1) 140 is connected to the conductive tip 101, and the other end of the primary coil (L1) 140 is connected to a ground terminal 125 of the conductive body 150.

Hereinafter, operation of the stylus pen 100 will be described.

One end of the primary coil (L1) 140 executes capacitive coupling with the touch sensor 200 (with reference to FIG. 5) of the sensor panel through the conductive tip 101, thus forming the sensing capacitor (Csx) 250.

Therefore, input signals from the respective channels of the touch sensor drive the primary coil (L1) 140 through the sensing capacitor (Csx) 250, and then drives the resonant circuit including the secondary coil (L2) 120 and the resonant capacitor (C2) 110 through first mutual inductance M12 formed by magnetic coupling. The circuit is configured such that a signal input to the respective channels Tx and Rx of the touch sensor 200 from the drive signal generator 305 is the same as the electromagnetic resonance frequency of the resonant circuit including the secondary coil (L2) 120 and the resonant capacitor (C2) 110. In this case, signal strength increases according to time due to electromagnetic resonance. The other end of the primary coil (L1) 140 is grounded through the ground capacitor (Ch) formed by the human hand and body contacting the conductive body 150 of the stylus pen 100.

The switch (SW) 130 is closed when the conductive tip 101 presses the surface of the sensor panel 201 at a designated pressure, and only at this time, electromagnetic resonance is generated, thus allowing input through the stylus pen 100 to be sensed. That is, even if the stylus pen 100 is close to the sensor panel 201, when the stylus pen 100 does not press the surface of the sensor panel 201 at a designated pressure, the stylus pen 100 is not operated, and thus malfunction of the stylus pen 100 is prevented. A magnetic field signal generated during electromagnetic resonance is transmitted to the antenna loop 410 located in the edge area of the sensor panel 201 and functions as a kind of tertiary coil (L3), and the touch controller 300 senses a difference of voltages at both ends of the antenna loop 410.

In the stylus pen 100 in accordance with the embodiment of the present invention, the interval between the primary coil (L1) 120 and the secondary coil (L2) 140 wound on the surfaces of the first core 135a and the second core 135b in the lengthwise direction is changed by change of the thickness t of the elastic member 155 interposed between the primary coil (L1) 120 and the secondary coil (L2) 140 according to change of writing pressure, and thus, such writing pressure may be detected through change of the value of the first mutual inductance (M12) according to change of the interval between the primary coil (L1) 120 and the secondary coil (L2) 140.

Here, the thickness t of the elastic member 155 is reduced as writing pressure increases, and the elastic member 155 maintains the initial thickness when no writing pressure is applied. The case that no writing pressure is applied means the case that the stylus pen 100 does not touch the sensor panel surface, and in this case, touch sensing is not carried out.

The primary coil (L1) 140 within the stylus pen 100 is wound on the first core 135a fixed by the supporter 157 and is thus fixed, and when writing pressure is applied, the writing pressure transmitted to the conductive tip 101 moves the position of the second core 135b upwards, and a distance between the secondary coil (L2) 120 and the primary coil (L1) 140 is decreased. In this case, the value of the mutual inductance (M12) between the primary coil (L1) 140 and the secondary coil (L2) 120 is calculated by Equation M12=k$\sqrt{L1L2}$ (k is a coupling coefficient). Here, since the coupling coefficient k increases as the distance decreases, the value of the mutual inductance M12 increases as the distance decreases.

Figure 10:
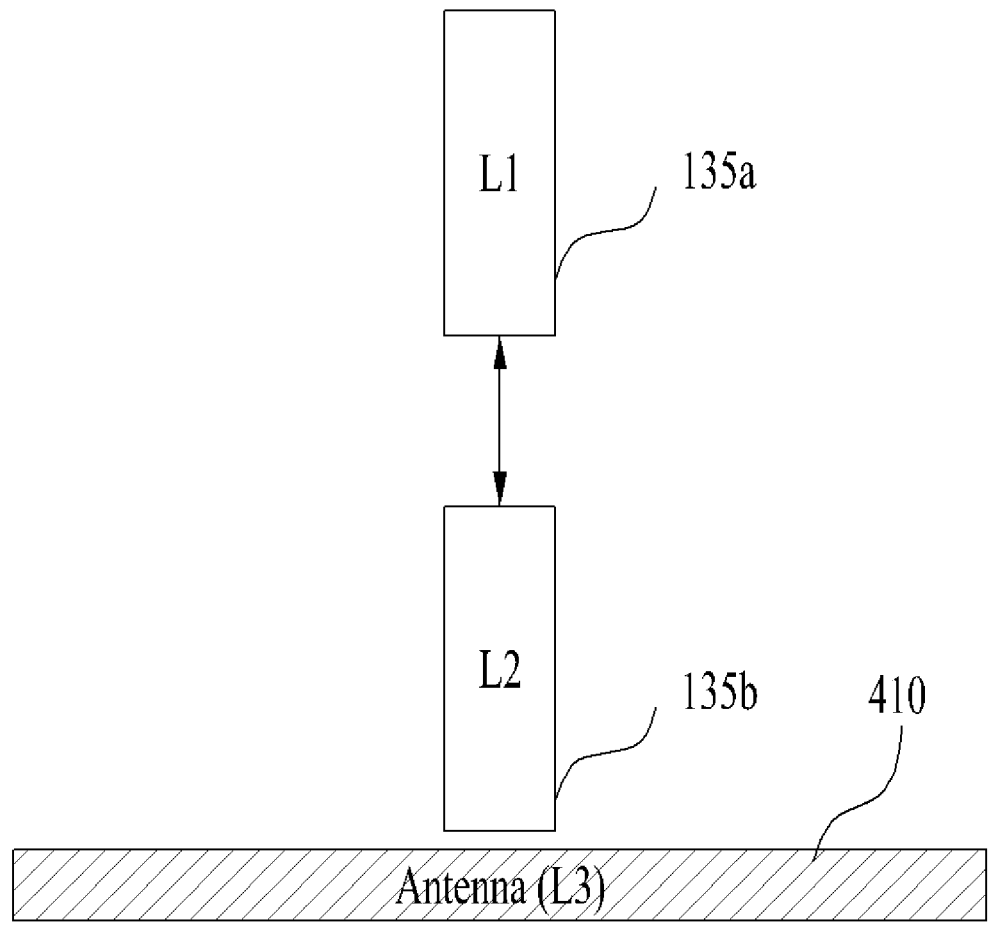
FIG. 10 is a view illustrating correspondence between the stylus pen and the touch sensor panel in accordance with the embodiment of the present invention.

FIG. 10 is a view illustrating correspondence between the stylus pen and the touch sensor panel in accordance with the embodiment of the present invention.

For example, when writing pressure increases and the interval between the primary coil (L1) and the secondary coil (L2) is decreased, the value of the first mutual inductance (M12) relatively increases as compared to when writing pressure is low, a signal value generated from the stylus pen 100 increases, and such a value of the first mutual inductance (M12) increases a value of the second mutual inductance (M23 or M13) generated between the stylus pen 100 and the antenna loop 410. Therefore, if writing pressure is high, the sensed signal value increases. In this manner, an intensity of writing pressure may be determined according to the signal value finally detected by the touch controller 300, and a character style or a character thickness in drawing suitable to the intensity of each writing pressure may be determined.

That is, due to use of the elastic member 155, change of the first mutual inductance (M12) according to change of writing pressure is induced, and the second mutual inductance (M23 or M13) between the antenna loop 410 and the stylus pen 100 in proportion to the first mutual inductance (M12) is also changed. That is, change of writing pressure may cause change of a value actually sensed by the antenna loop 410, and thus, a degree of change of writing pressure may be measured based on change of the sensed value.

The initial thickness of the elastic member 155 is set to 0.7~2.0 mm. Such an elastic member 155 may be varied within the range of a thickness of about 0.7 mm according to pressure.

Figure 11:
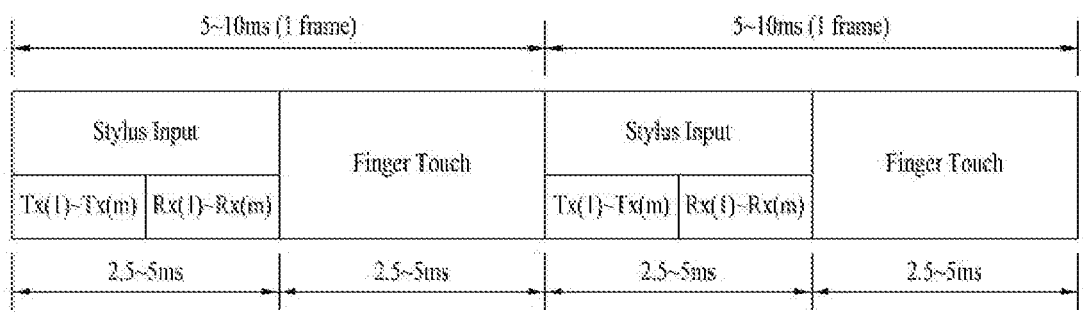
FIG. 11 is a view illustrating a frame driving method of the input system in accordance with the embodiment of the present invention.

FIG. 11 is a view illustrating a frame driving method of the input system in accordance with the embodiment of the present invention.

As exemplarily shown in FIG. 11, the input system in accordance with the embodiment of the present invention drives one frame in a time division driving manner, i.e., divides one frame into a section for detection of finger touch and a section for detection of stylus touch. The section for detection of finger touch and the section for detection of stylus touch are alternately performed.

For example, if one frame corresponds to a time of 5~10 ms, a frame rate corresponds to 100~200 Hz. In this case, when one frame is divided into a section for detection of finger touch and a section for detection of stylus touch, the respective sections correspond to a time of 2.5~5 ms. This is applied to the case that one frame is divided into two equal sections for detection of finger touch and detection of stylus touch, and, as needed, the time of one of the two sections may be elongated within one frame.

During detection of stylus touch, on the assumption that the number of the first channels Tx is m and the number of the second channels Rx is n, as exemplarily shown in FIG. 6, the m first channels Tx(1)~Tx(m) and the n second channels Rx(1)~Rx(n) are sequentially driven and sensed.

That is, a total of the 'm+n' channels are sequentially driven within the section for detection of stylus touch. Therefore, for example, on the assumption that m+n=50, a time taken to drive one channel is 50~100 μs acquired by dividing 2.5~5 ms by 50.

Then, during detection of finger touch, a drive signal is sequentially applied to the first channels Tx and detection signals at the second channels Rx is sensed, and thus a touch position is detected by detecting change according to touch. Since, during detection of finger touch, the drive signal is applied only to the first channels Tx, a drive signal applying time (2.5~5 ms/m) of each first channel Tx during detection of finger touch may be longer than a drive signal applying time (2.5~5 ms/(m+n)) of each channel Tx or Rx during detection of stylus touch.

In this case, a signal waveform and a sensing waveform driving each channel alternately drive stylus input and finger touch through the time division driving manner which will be described later.

Next, a driving and sensing method of the respective channels during detection of stylus pen touch will be described.

A driving and sensing process of two adjacent first channels Tx(n) and Tx(n+1) of the input system in accordance with the embodiment of the present invention will be described.

Although FIG. 11 illustrates a driving process of the channels Tx(n) and Tx(n+1), such a process may be carried out by applying a signal sequentially to the channels Tx(1)~Tx(m) and Rx(1)~Rx(n) and executing touch detection based on a difference between voltages received at both ends of the antenna loop 410 according to the respective channels.

In order to execute touch detection, the sensing capacitor (Csx) formed by coupling between the conductive tip 101 (with reference to FIG. 7A) and the sensor panel 201 is electrically connected to the primary coil (L1). Thereafter, the switch (SW) is closed to form the resonant circuit of the secondary coil (L2) and the resonant capacitor (C2). Thereby, the inductance value of the secondary coil (L2) increases due to electromagnetic resonance in the resonant circuit by the first mutual inductance (M12) between the primary coil (L1) and the secondary coil (L2), and the antenna loop 410 receives induced electromotive force electromagnetically resonated by the second mutual inductance (M13 or M23).

That is, when the value of the first mutual inductance M12 is increased, a signal is more effectively transmitted from the primary coil (L1) to the secondary coil (L2) and a resonance signal at the secondary coil (L2) is increased. The increased resonance signal of the secondary coil (L2) is proportionally transmitted to the antenna loop 410 functioning as the tertiary coil (L3). Therefore, when writing pressure increases, a signal received by the tertiary coil (antenna loop) L3 is increased in proportion to increase of the writing pressure.

The signal applied to the plurality of first and second channels Tx(1)~Tx(m) and Rx(1)~Rx(n) may be square waves or sine waves of the same frequency as resonance frequency in the resonant circuit, as exemplarily shown in FIG. 11.

The stylus pen may be grounded by a user when the stylus pen touches the sensor panel surface. Here, while grounded, the user may directly contact the conductive body of the stylus pen or connect the conductive body to the sensor penal through a wire.

If the channel Tx(n) is driven, a signal of square waves or sine waves of a designated frequency from the touch controller is applied to the channel Tx(n) for a time T1.

When the signal of square waves or sine waves is applied to the channel Tx(n) for the time T1, the primary coil (L1) of the stylus pen forms the sensing capacitor (Csx) generated between the channel Tx(n) and the conductive tip by capacitive coupling for such a time T1. Further, when the stylus pen touches the sensor panel surface, electrical connection between the sensing capacitor (Csx) and the conductive tip is formed, and thereby, a small waveform in synchronous with the square waves is generated from the primary coil. This forms the first mutual inductance (M12) by coupling between the primary coil and the secondary coil, and therethrough, the secondary coil is driven. Here, a waveform of the secondary coil increases as time goes by. The reason for this is that electromagnetic resonance occurs through the resonant capacitor (C2) connected in series in the closed resonant circuit and resonance frequency and the amplitude of electromagnetic resonance increases according to time.

Further, when the stylus pen touches the sensor panel, the primary coil (L1) or the secondary coil (L2) are coupled with the antenna loop in the sensor panel through the second mutual inductance (M13 or M23), and thus, the antenna loop may sense an electromagnetic signal generated by resonance of the stylus pen.

The antenna loop stores signal strength digital data regarding a voltage difference between both ends of the antenna loop at the corresponding channel by detecting a difference between voltages received at both ends of the antenna loop, amplifying such a voltage difference, removing noise from the amplified voltage difference, converting the amplified voltage difference, from which noise is removed, from an analog signal to a digital signal, and storing the digital signal in a memory.

Thereafter, in case of the channel Tx(n+1), a drive signal is applied to the channel Tx(n+1), an electromagnetic signal is sensed, and digital data in proportion to the strength of such a signal is stored in the memory, in the same manner as the above-described method.

When pieces of signal strength digital data of respective channels of one frame acquired through such a process are collected, the digital signal processor of the touch controller extracts coordinates of a position where the stylus pen is located.

A signal receiving section of the stylus pen may correspond to a section of time T1+T2 or a section of time T2. If the signal receiving section is the section of time T1+T2, a time to receive signals may be elongated and thus, increase of accuracy of the measured signals may be expected. However, the channels Tx or the channels Rx may be driven for the time T1, a parasitic loop formed by these channels may induce a magnetic field signal, such a signal may serve as a noise component of the antenna loop, and the antenna loop may receive such noise together with a signal generated from the resonant circuit in the stylus pen.

Therefore, if accurate touch detection is difficult due to magnetic field interference by the parasitic loop, signal detection may be executed by detecting a resonance signal from the stylus pen only in the section of time T2. In this case, since the resonance signal is not received for the time T1, a signal receiving time and data accuracy may be reduced, but noise caused by the magnetic field signal does not influence the antenna loop.

Figure 12:
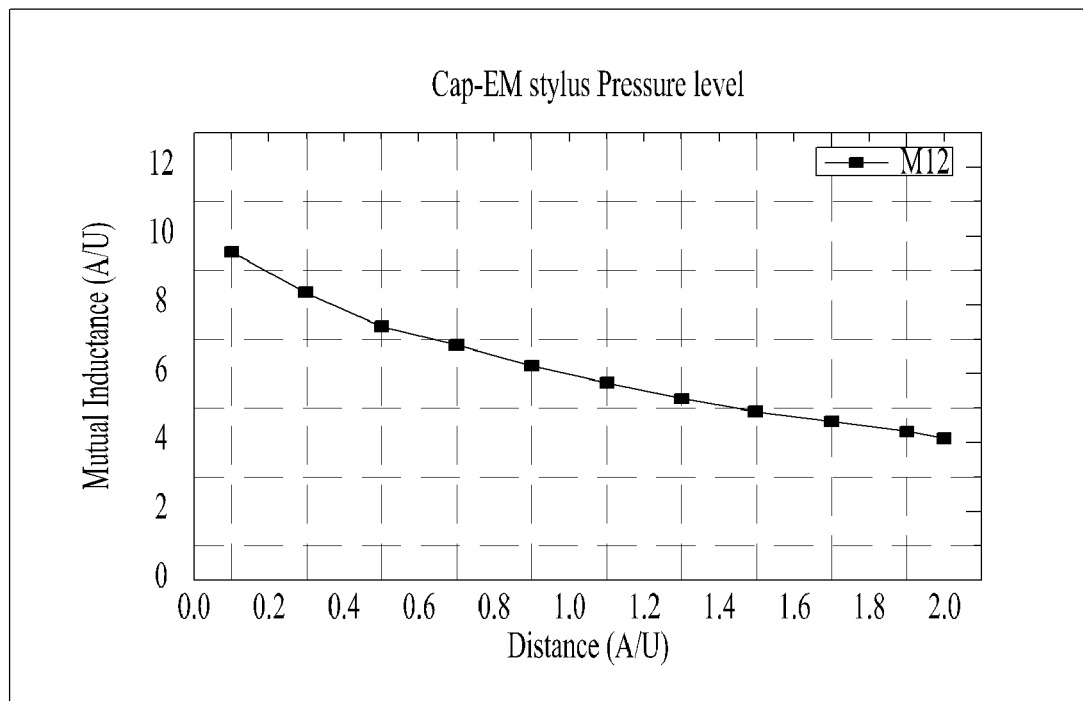
FIG. 12 is a graph illustrating variation of first internal mutual inductance according to the writing pressure of the stylus pen in accordance with the embodiment of the present invention.

FIG. 12 is a graph illustrating variation of the first internal mutual inductance according to writing pressure of the stylus pen in accordance with the embodiment of the present invention.

As exemplarily shown in FIG. 12, in the stylus pen in accordance with the embodiment of the present invention, it is understood that the thickness t of the elastic member between the first core and the second core (expressed as the distance in the graph of FIG. 12) is reduced and the first mutual inductance (M12) is gradually increased, as writing pressure increases.

When writing pressure is varied, the second mutual inductance (M23 or M13) has a fixed value, but the first mutual inductance (M12) is varied according to variation of the writing pressure. Therefore, the variation of writing pressure may be detected by sensing the variation of the first mutual inductance (M12).

Figure 13:
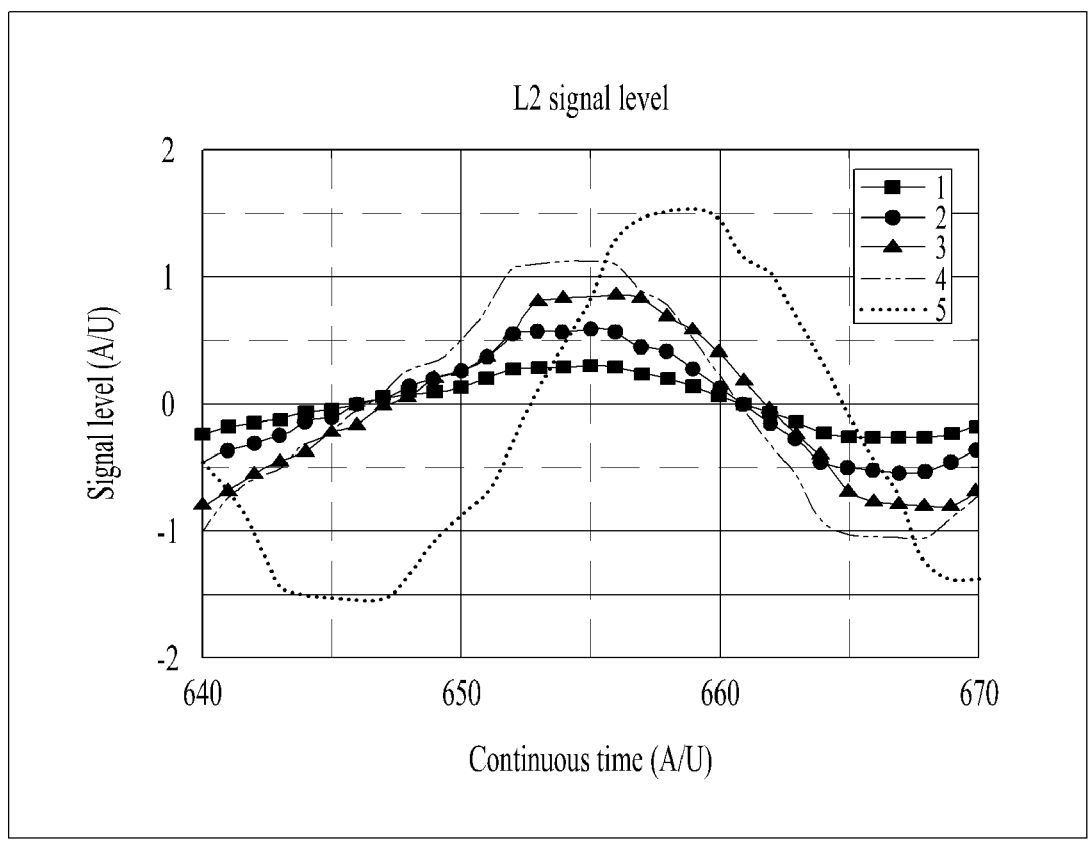
FIG. 13 is a graph illustrating variation of time to signal of a secondary coil according to the intensity of writing pressure, in the input system in accordance with the embodiment of the present invention.
Figure 14:
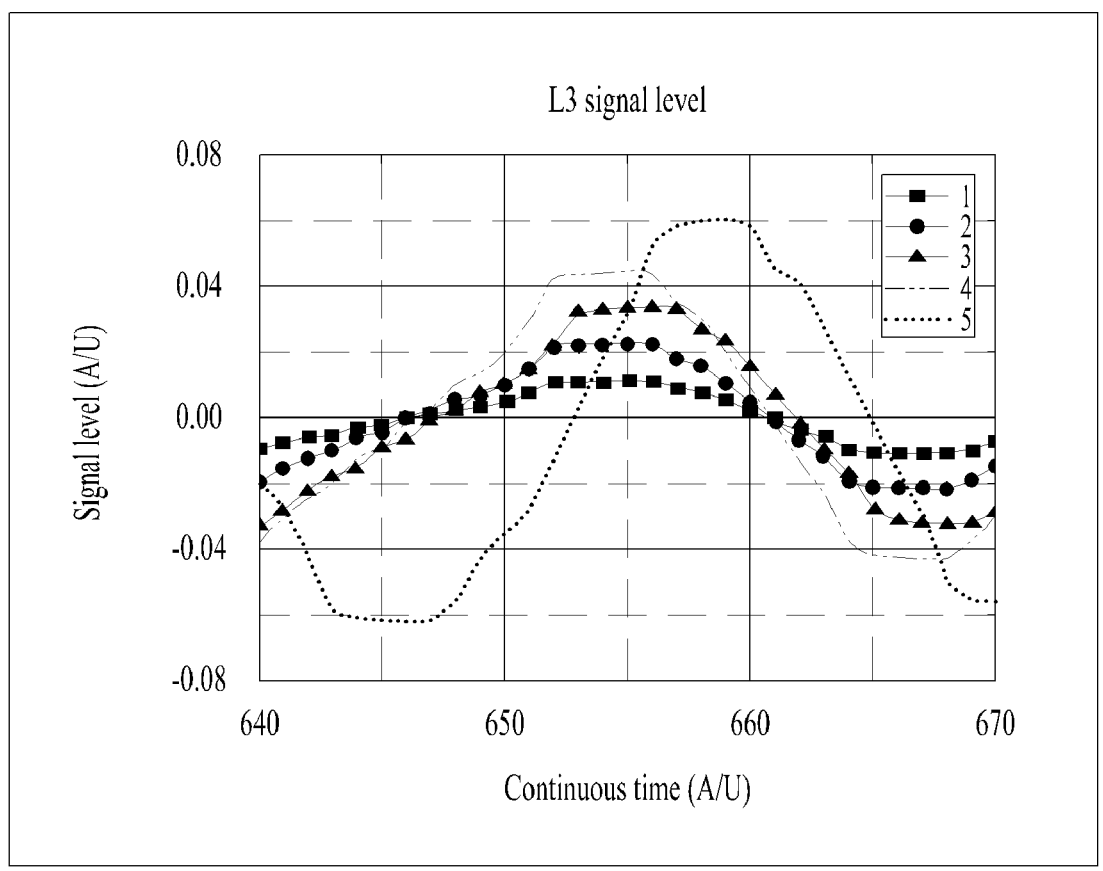
FIG. 14 is a graph illustrating variation of time to signal of an antenna loop according to the intensity of writing pressure, in the input system in accordance with the embodiment of the present invention.

FIG. 13 is a graph illustrating variation of time to signal of the secondary coil according to the intensity of writing pressure, in the input system in accordance with the embodiment of the present invention, and FIG. 14 is a graph illustrating variation of time to signal of the antenna loop according to the intensity of writing pressure, in the input system in accordance with the embodiment of the present invention.

In the graphs, writing pressure uniformly increases from 1 to 5.

Although waveforms are varied according to time, it is understood that the detected signal values of the secondary coil (L2) and the tertiary coil (antenna loop, L3) are larger as writing pressure is higher.

That is, it is confirmed through experiments that, when the interval between the primary and secondary coils is decreased according to increase of writing pressure, the value of the first mutual inductance (M12) is increased and the detected signal values of the respective coils are increased in proportion to increase of the value of the first mutual inductance (M12). That is, when writing pressure increases, received signals are increased in proportion to increase of writing pressure.

Since detection is carried out substantially at the tertiary coil (antenna loop) connected to the touch controller, the touch controller may detect increase of writing pressure through both ends of the tertiary coil.

FIGS. 15A to 15D are views illustrating primary and secondary coils and components therebetween in stylus pens in accordance with various embodiments of the present invention.

As exemplarily shown in FIGS. 15A to 15D, each of the stylus pens in accordance with the embodiments of the present invention is configured such that a depression and a protrusion are provided on the surface of at least one of a first core and a second core corresponding to an elastic member and the elastic member is inserted into the depression.

Here, although not shown in the drawings, a primary coil and a secondary coil are respectively wound on the surfaces of the first core and the second core from the upper parts to the lower parts thereof in the direction of a long axis.

The stylus pens in accordance with these embodiments of the present invention are designed such that a signal finally detected by the touch controller increases as the interval t between the primary coil and the secondary coil decreases, and thus the interval between the primary coil and the secondary coil becomes 0 when writing pressure is the maximum.

Figure 15A:
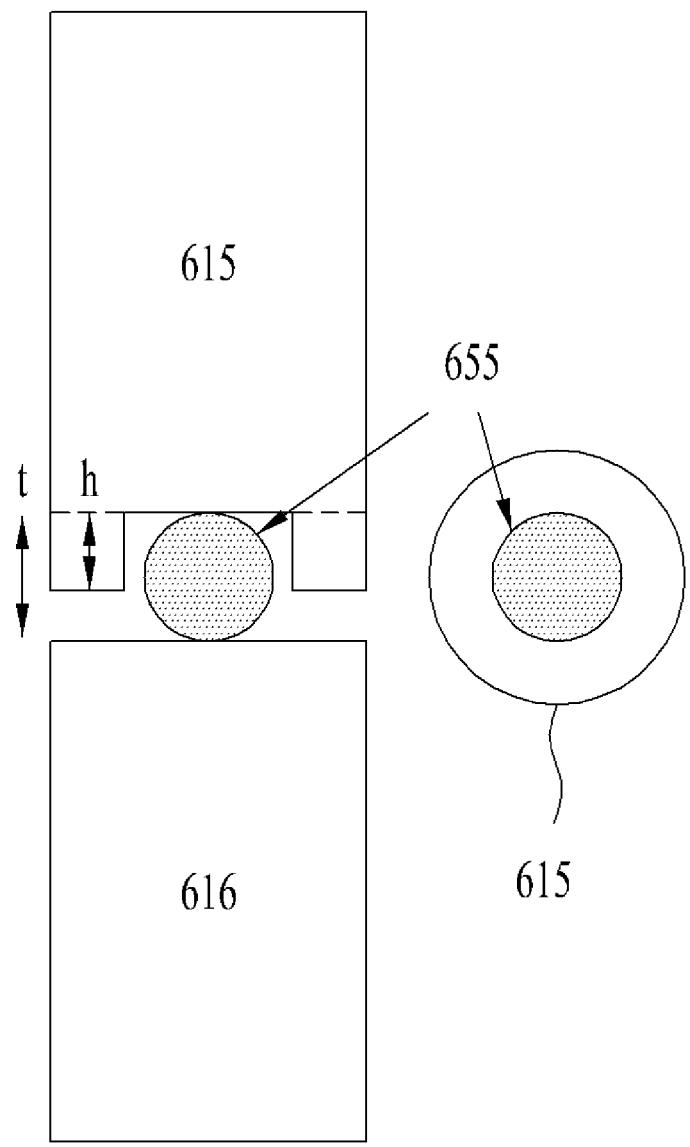
FIGS. 15A to 15D are views illustrating primary and secondary coils and components therebetween in stylus pens in accordance with various embodiments of the present invention.

In the stylus pen shown in FIG. 15A, a protrusion is provided at the edge of the surface of a first core 615 corresponding to an elastic member 655, and a depression corresponding to the elastic member 655 is relatively provided at the center of the surface of the first core 615. Then, the elastic member 655 is inserted into the depression. The elastic member 655 has a thickness varied when writing pressure is physically applied thereto, and is designed such that the thickness of elastic member 655 in an initial state is greater than a distance h between the depression and the protrusion. In this case, the surface of a second core 616 corresponding to the elastic member 655 is flat.

Although not shown in the drawings, the first core 615 and the second core 616 may be designed such that the shapes of the surfaces of the first core 615 and the second core 616 corresponding to the elastic member 655 are opposite each other.

Although FIG. 15A illustrates the elastic member 655 as having a circular cross-section, the elastic member 655 is not limited thereto. The elastic member 655 may have various polygonal-shaped cross-section.

Figure 15B:
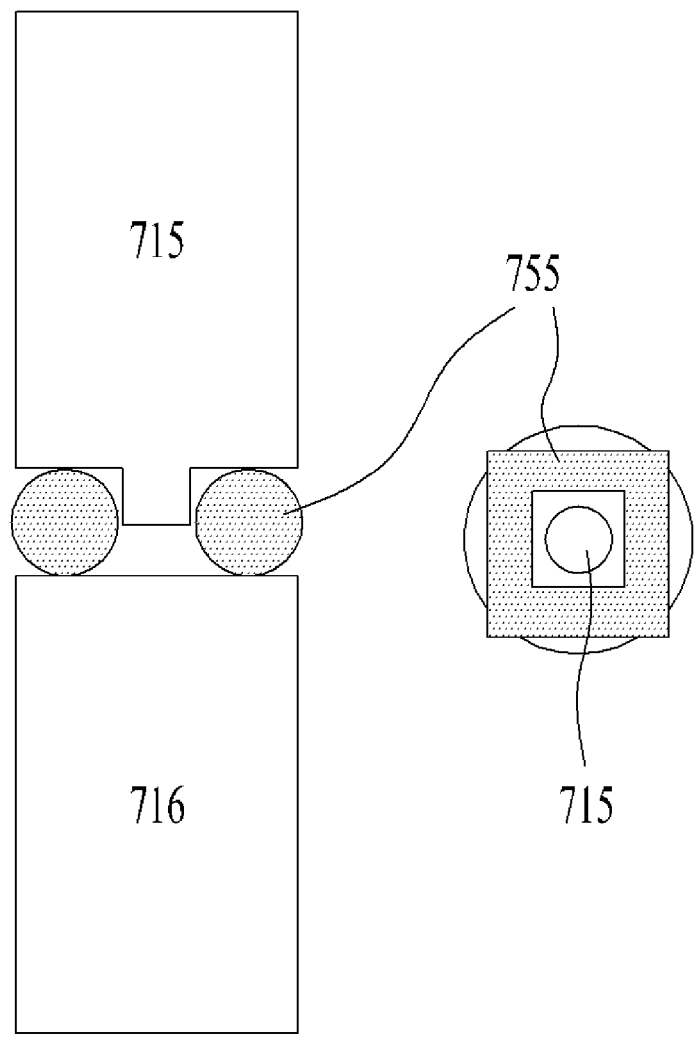

In the stylus pen shown in FIG. 15B, a protrusion is provided at the center of the surface of a first core 715 corresponding to an elastic member 755, and a depression corresponding to the elastic member 755 is relatively provided at edge of the surface of the first core 715. In this case, the center of the elastic member 755 is opened, and the protrusion of the first core 715 may be inserted into an open center of the elastic member 755.

In this case, the surface of a second core 716 corresponding to the elastic member 755 is flat.

Although not shown in the drawings, the first core 715 and the second core 716 may be designed such that the shapes of the surfaces of the first core 715 and the second core 716 corresponding to the elastic member 755 are opposite each other.

In the same manner, the elastic member 755 has a thickness varied when writing pressure is physically applied thereto, and is designed such that the thickness of elastic member 755 in an initial state is greater than a distance h between the depression and the protrusion. In this case, the surface of the second core 716 corresponding to the elastic member 755 is flat.

FIG. 15B illustrates the elastic member 755 as having a square-shaped cross section with an open center.

Figure 15C:
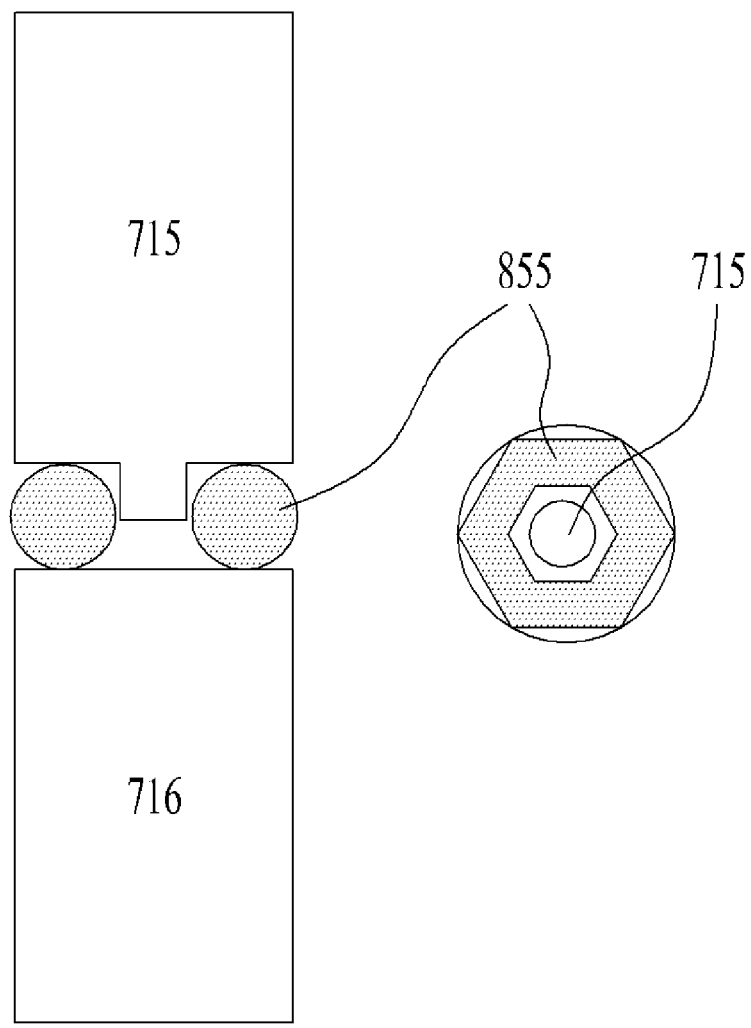

FIG. 15C illustrates an elastic member 855 as having a hexagonal-shaped cross-section with an open center, as compared to FIG. 15B.

Figure 15D:
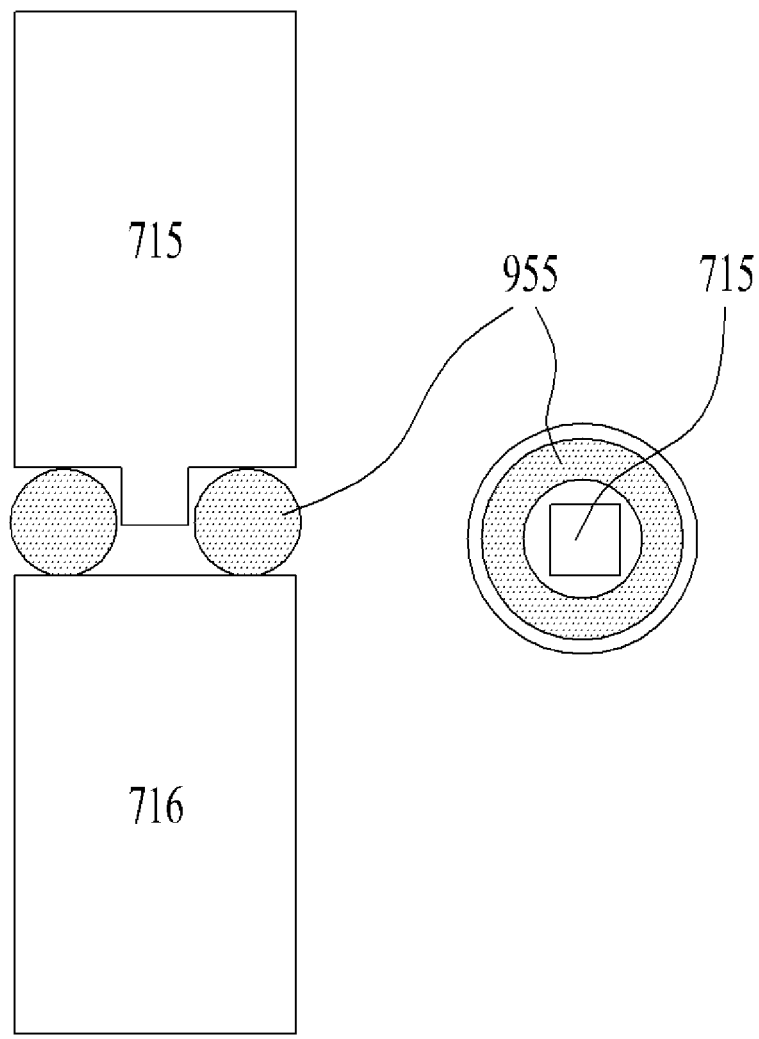

FIG. 15D illustrates an elastic member 955 as having a ring-shaped cross-section with an open center, as compared to FIG. 15B.

If the first core 715 is provided with the protrusion at the center thereof, the first core 715 is not limited to the shapes shown in FIGS. 15B to 15D, and may have various polygonal-shaped cross-sections with an open center.

Detection of touch using an input system in accordance with one embodiment of the present invention has advantages, as follows.

The input system in accordance with the embodiment of the present invention may reduce manufacturing costs and simplify a manufacturing process, as compared to an input system having different panels for detection of finger touch and detection of stylus pen touch. Further, the input system in accordance with the embodiment of the present invention may form a thin sensor panel.

A stylus pen of the input system in accordance with the embodiment of the present invention includes a primary coil and a secondary coil, a first core and a second core on which the respective coils are wound are separated and connected in series, and an elastic member is interposed between the first core and the second core such that the thickness of the elastic member is varied according to variation of writing pressure. Thereby, when writing pressure is varied, an interval between the primary coil and the secondary coil is varied, the mutual inductance between the primary coil and the secondary coil is changed according to variation of writing pressure, and thus the thickness of characters may be adjusted according to writing pressure when the stylus pen touches the sensor panel.

Further, touch may be detected by transmission of a magnetic field signal between the resonant circuit within the stylus pen and an antenna loop of the sensor panel, and a battery in the stylus pen is not required and thus, manufacturing costs of the stylus pen in accordance with the embodiment of the present invention are reduced as compared to an active stylus pen requiring a separate power supply. Further, a light and small stylus pen may be manufactured.

Further, the input system in accordance with the embodiment of the present invention may divisionally sense stylus pen touch and finger touch by different driving methods, palm rejection may be easily achieved during stylus pen touch, and thereby, accuracy in touch sensitivity may be improved.

Further, since sensing capacitance (Csx) generated between the stylus pen and one electrode rather than mutual capacitance (ΔCm) between intersecting electrodes used in a capacitive type is used in detection of touch, relatively larger sensing capacitance is used in detection of stylus pen touch, and thus improvement of sensitivity is expected.

A frequency signal of the resonant circuit within the stylus pen is set in synchronous with a drive signal applied to the electrodes (channels) in the sensor panel, writing pressure or whether or not a special button is pressed may be easily applied.

Further, since the antenna loop used in detection of touch by the stylus pen is separated from the active area in which the intersecting electrodes are formed, and is located at an area being more outside than the edge area having low sensitivity, sensitivity of the stylus pen may be uniformly maintained regardless of areas.

As apparent from the above description, an input system and a touch detection method using the same in accordance with one embodiment of the present invention has effects, as follows.

First, the input system in accordance with the embodiment of the present invention basically has a structure of detecting finger touch in a capacitive type, and may detect stylus pen touch by resonance through an inner resonant circuit of a stylus pen and an antenna loop at the edge area of a sensor panel. That is, the input system may detect stylus pen touch, which is limited in detection in the capacitive type, without influence on a contact area or the shape of an electrode pattern by changing the configuration of the edge area of the sensor panel and the inner circuit of the stylus pen without using a separate panel.

Second, a stylus pen of the input system in accordance with the embodiment of the present invention includes a primary coil and a secondary coil, a first core and a second core on which the respective coils are wound are separated and connected in series, and an elastic member is interposed between the first core and the second core such that the thickness of the elastic member is varied according to variation of writing pressure. Thereby, when writing pressure is varied, an interval between the primary coil and the secondary coil is varied, the mutual inductance between the primary coil and the secondary coil is changed according to variation of writing pressure, and thus the thickness of characters may be adjusted according to writing pressure when the stylus pen touches a sensor panel.

Third, the input system in accordance with the embodiment of the present invention may reduce manufacturing costs and simplify a manufacturing process, as compared to an input system having different panels for detection of finger touch and detection of stylus pen touch. Further, the input system in accordance with the embodiment of the present invention may form a thin sensor panel.

Fourth, touch may be detected by resonance between the resonant circuit within the stylus pen and the antenna loop of the sensor panel, and a battery in the stylus pen is not required and thus, manufacturing costs of the stylus pen in accordance with the embodiment of the present invention are reduced as compared to an active stylus pen requiring a separate power supply. Further, a light and small stylus pen may be manufactured.

Fifth, the input system in accordance with the embodiment of the present invention may divisionally sense stylus pen touch and finger touch by different driving methods, palm rejection may be easily achieved during stylus pen touch, and thereby, accuracy in touch sensitivity may be improved.

Sixth, since sensing capacitance (Csx) generated between the stylus pen and one electrode rather than mutual capacitance (ΔCm) between intersecting electrodes used in a capacitive type is used in detection of touch, relatively larger sensing capacitance may be used in detection of stylus pen touch as compared to the conventional input system. Therefore, improvement of sensitivity is expected.

Seventh, the antenna loop used in detection of stylus pen touch is separated from the active area in which the intersecting electrodes are formed, and is located at an area being more outside than the edge area having low sensitivity, sensitivity of the stylus pen may be uniformly maintained regardless of areas.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An input system comprising:
a sensor panel including a plurality of first channels and a plurality of second channels which intersect each other;
a stylus pen including a first core and a second core divided from each other, a primary coil and a secondary coil wound on the first and second cores, an elastic member interposed between the first core and the second core, a resonant capacitor and a switch connected to the secondary coil in series, and a conductive tip connected to the primary coil;
a ground unit connected to the stylus pen;
an antenna loop formed at the edge area of the sensor panel; and
a touch controller connected to the first channels, the second channels, and the antenna loop.

2. The input system according to claim 1, wherein, when the stylus pen presses the surface of the sensor panel, the thickness of the elastic member is reduced and thus an interval between the primary coil and the secondary coil is reduced as pressure generated by pressing the stylus pen onto the surface of the sensor panel is increases.

3. The input system according to claim 2, wherein the surface of at least one of the first core and the second core corresponding to the elastic member is provided with a depression and a protrusion, and thus the elastic member is inserted into the depression.

4. The input system according to claim 3, wherein the elastic member is provided with an opening corresponding to the protrusion.

5. The input system according to claim 3, wherein the cross-section of the elastic member has a circular or polygonal shape.

6. The input system according to claim 2, wherein the stylus pen further includes a conductive body including the first core and the second core on which the primary coil and the secondary coil are wound, connected in series by the elastic member interposed therebetween, and provided with a hole partially protruding the conductive tip under the second core.

7. The input system according to claim 6, wherein the first core is fixed to the inside of the conductive body at the opposite side of the conductive tip.

8. The input system according to claim 7, wherein, when the stylus pen presses the surface of the sensor panel, the conductive body becomes close to the surface of the sensor panel according to the pressing of the stylus pen onto the surface of the sensor panel.

9. The input system according to claim 6, wherein the conductive body is connected to the ground unit.

10. The input system according to claim 6, wherein the switch is formed of an elastic material, is electrically insulated from the conductive tip, and is operated by pressure applied to the conductive tip.

11. The input system according to claim 10, wherein the switch is connected to the secondary coil, and is electrically insulated from the second core.

12. The input system according to claim 11, wherein one end of the primary coil is connected to the conductive tip, and the other end of the primary coil is connected to the conductive body.

13. The input system according to claim 12, wherein the antenna loop receives an inductance signal resonated from the secondary coil within the stylus pen when the stylus pen touches the surface of the sensor panel.

14. The input system according to claim 13, wherein the antenna loop surrounds the edge area of the sensor panel, and both ends of the antenna loop are provided with pads and are connected to the touch controller through the pads.

15. The input system according to claim 6, wherein the ground unit is a user or a wire connected between the conductive body and the sensor panel.

16. The input system according to claim 6, wherein the touch controller includes:
an amplifier connected to the antenna loop and amplifying a difference between voltages received at both ends of the antenna loop;
an analog front end (AFE) connected to the amplifier and removing noise;
an analog to digital converter (ADC) connected to the AFE and converting an analog signal into a digital signal;
a digital signal processor (DSP) connected to the ADC and extracting coordinates by collecting digital signals; and
a drive signal generator generating a signal applied to the respective channels in the sensor panel.

17. The input system according to claim 16, wherein, when the stylus pen touches the surface of the sensor panel, the switch is closed and the secondary coil and the resonant capacitor form a closed circuit.

18. The input system according to claim 16, wherein the signal applied from the drive signal generator to the respective channels is square waves or sine waves of the same frequency as resonance frequency in the closed circuit.

19. The input system according to claim 1, wherein the first core and the second core are formed of ferrite.

* * * * *